US007259368B2

(12) United States Patent
Frazer et al.

(10) Patent No.: US 7,259,368 B2

(45) Date of Patent: Aug. 21, 2007

(54) APPARATUS FOR DELIVERING IONS FROM A GROUNDED ELECTROSPRAY ASSEMBLY TO A VACUUM CHAMBER

(75) Inventors: William D. Frazer, Mountain View, CA (US); Steven M. Fischer, Hayward, CA (US); Robert K. Crawford, Palo Alto, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 0 days.

(21) Appl. No.: 11/361,125

(22) Filed: Feb. 24, 2006

(65) Prior Publication Data

US 2006/0145071 A1 Jul. 6, 2006

Related U.S. Application Data

(63) Continuation of application No. 10/977,179, filed on Oct. 29, 2004, now Pat. No. 7,041,966, which is a continuation of application No. 09/579,276, filed on May 25, 2000, now Pat. No. 6,998,605.

(51) Int. Cl.
*B01D 59/44* (2006.01)
*H01J 49/00* (2006.01)

(52) U.S. Cl. ...................... 250/281; 250/282; 250/287; 250/288; 250/292; 250/423 R; 250/423 F; 250/424; 250/425

(58) Field of Classification Search ................. 250/281
See application file for complete search history.

(56) References Cited

U.S. PATENT DOCUMENTS

| | | | | |
|---|---|---|---|---|
| 5,614,711 | A * | 3/1997 | Li et al. | 250/287 |
| 6,147,345 | A * | 11/2000 | Willoughby | 250/288 |
| 6,157,030 | A * | 12/2000 | Sakairi et al. | 250/292 |
| 6,204,500 | B1 * | 3/2001 | Whitehouse et al. | 250/287 |
| 6,455,845 | B1 * | 9/2002 | Li et al. | 250/287 |
| 6,534,764 | B1 * | 3/2003 | Verentchikov et al. | 250/287 |

* cited by examiner

*Primary Examiner*—Frank G. Font
*Assistant Examiner*—Mary El-Shammaa

(57) ABSTRACT

The present invention relates to an apparatus for delivering ions to a vacuum chamber. The apparatus comprises an ionization chamber, an ionization region within the ionization chamber, a vacuum interface at a vacuum interface voltage and a vacuum chamber, wherein the ionization chamber communicates with the vacuum chamber through the vacuum interface. Sample is introduced into the ionization chamber from an electrospray assembly at approximately ground potential. Two electrodes are provided within the chamber such that three electric fields are generated, a first field extending from the electrospray assembly to the first electrode, a second field extending from the second electrode to the first electrode, and a third field extending from the second electrode to the vacuum interface. Ions are forced to travel through the fields in order before entering the vacuum chamber. In addition, the invention provides a method of delivering ions to a vacuum chamber.

16 Claims, 4 Drawing Sheets

APPARATUS FOR DELIVERING IONS FROM A GROUNDED ELECTROSPRAY ASSEMBLY TO A VACUUM CHAMBER

RELATED INFORMATION

This application is a continuation of application Ser. No. 10/977,179 filed on Oct. 29, 2004 now U.S. Pat. No. 7,041,966, which is a continuation of application Ser. No. 09/579,276 filed on May 25, 2000, now U.S. Pat. No. 6,998,605, which is incorporated herein by reference in its entirety.

TECHNICAL FIELD

The present invention relates to an apparatus and method for delivering ions to a vacuum chamber. More particularly, the present invention relates to a mass spectrometer system adapted to deliver ions from a grounded electrospray assembly to a vacuum chamber.

BACKGROUND

Mass spectrometers employing atmospheric pressure electrospray ionization (ESI) have been demonstrated to be particularly useful for obtaining mass spectra from liquid samples and have widespread application. ESI has been used with quadrupole, magnetic and electric sector, Fourier transform, ion trap, and time-of-flight mass spectrometers. ESI mass spectrometry (MS) is frequently used in conjunction with high performance liquid chromatography (HPLC), and combined HPLC/ESI-MS systems are commonly used in the analysis of polar and ionic species, including biomolecular species. ESI has also been used as a MS interface with capillary electrophoresis (CE), supercritical fluid chromatography (SFC), and ion chromatography (IC). ESI-MS systems are particularly useful for transferring relatively nonvolatile and high molecular weight compounds such proteins, peptides, nucleic acids, carbohydrates, and other fragile or thermally labile compounds from the liquid phase to the gas phase while also ionizing the compounds.

ESI is a "soft" or "mild" ionization technique that generates a charged dispersion or aerosol at or near atmospheric pressure and typically at ambient temperature. Since ESI generally operates at ambient temperatures, labile and polar samples may be ionized without thermal degradation, and the mild ionization conditions generally result in little or no fragmentation. Typically, the aerosol is produced in an ionization chamber by passing the liquid sample containing solvent and analyte through an electrospray assembly which is subjected to an electric potential gradient (operated in positive or negative mode). The electric field at the needle tip charges the surface of the emerging liquid which disperses into a fine spray or aerosol of charged droplets. Subsequent heating and/or use of an inert drying gas such as nitrogen or argon are typically employed to evaporate the droplets and remove solvent vapor before MS analysis. Variations on ESI systems optionally employ nebulizers, such as with pneumatic, ultrasonic, or thermal "assists," to improve dispersion and uniformity of the droplets. Once ions are formed, they are then transported through a vacuum interface into a vacuum chamber containing a mass analyzer for MS analysis.

Mass spectrometers may employ one or both of two types of vacuum interfaces: the conduit and the orifice plate. Both serve to control the amount of matter that enters the vacuum chamber so that the pump responsible for generating a vacuum is not overwhelmed. Typically, the type of interface selected for any mass spectrometer depends on the overall design of the apparatus and the conditions under which ions are generated. For example, metallic or dielectric conduits such as those with an axial bore of capillary dimensions may be useful for restricting the number of molecules reaching the vacuum and for providing directionality to ion flow thereby effecting ion transport. In addition, conduits may be adapted to provide mass filtration, thereby removing background noise. The conduits can be heated to further effect droplet drying. However, conduits also have inherent drawbacks. For example, the total ion flux that emerges from the interface into the vacuum chamber may be too low for use with multi-sequence instruments.

In addition, the vacuum interface may comprise an opening in a plate that is charged with respect to the electrospray assembly. An opening in a plate may advantageously allow delivery of a large number of ions to the mass detector thereby resulting in a strong overall signal for any particular sample. Such a high ion flux is useful in multisequence instruments. However, there are many drawbacks to using a plate having an opening. For example, drying paths for a plate design are typically shorter than for a design that includes a conduit, and drying is therefore more difficult when a plate is used in place of a conduit. In addition, a charged plate usually requires a non-grounded electrospray assembly which may result in possible shock to a user of the instrument. The shock danger associated with using a charge plate is described with greater detail below.

To produce the electric potential gradient needed to ionize a sample, the electrospray assembly is insulated from the vacuum interface, and either the electrospray assembly, the vacuum interface, or both, are charged. Therefore, at least one of the electrospray assembly or the vacuum interface cannot be at ground potential. In addition, many mass spectrometers, particularly those using an orifice plate or a metal capillary, are designed such that the vacuum interface is electrically connected to ESI chambers that are fabricated from metals. Metals possess preferred structural and thermal properties, and use of plastics in such chambers often results in chemical contamination from outgassing. Subjecting an entire ionization chamber to a high potential would require a more expensive power supply than charging only the electrospray assembly. Thus, it is typically the electrospray assembly that is charged to a higher potential with respect to the rest of the mass spectrometer.

However, there are several drawbacks in using a charged electrospray assembly. First, an electrospray assembly at a high voltage to ground poses a possible shock hazard to the operator during its operation. The risk of electrical shock may result in operator reluctance in performing necessary routine adjustment and maintenance to ensure optimal operation of the electrospray assembly. As a result, the accuracy and the reliability of data from the mass spectrometer are compromised. In addition, an electrospray assembly may be adapted to be connected to other devices such as capillary electrophoresis systems or planar chips, and a charged electrospray assembly may interfere with operation of such devices. Moreover, liquid is often passed through the electrospray assembly during operation, and the liquid provides a medium through which electric current will flow. Thus, the power supply used to charge the electrospray assembly must be able to compensate for this leakage current.

Mass spectrometers having a substantially grounded electrospray assembly are not unknown in the art. For example, U.S. Pat. No. 5,838,003 to Bertsch et al. pertains to a mass spectrometry system having an electrospray ionization chamber incorporating an asymmetric electrode, wherein an electrospray assembly is described that may be operated at approximately ground potential in conjunction with a capillary operated at a high voltage. Because the housing of the chamber is at approximately ground potential, the capillary must be composed of a dielectric material or be electrically insulated from the housing. In addition, a capillary may disadvantageously remove ions traveling therethrough, reducing the number of ions available to produce a spectrum.

Thus, there is a need to provide a mass spectrometer with a grounded electrospray system that does not require any particular vacuum interface such as a dielectric capillary or other insulated vacuum interface between the ionization chamber and a vacuum chamber.

SUMMARY OF THE INVENTION

Accordingly, it is an object of the present invention to overcome the above-mentioned disadvantages of the prior art by providing a new apparatus to deliver ions to a vacuum chamber through a vacuum interface.

It is another object of the invention to provide such an apparatus which employs an electrospray assembly at or near ground potential, thereby reducing the risk of electric shock.

It is still another object of the invention to provide such an apparatus that uses an electrospray assembly operating at or near ground potential irrespective of the form of the vacuum interface, e.g., an aperture in plate, a dielectric or metallic capillary, etc.

It is a further object of the invention to provide a method for delivering ions to a vacuum chamber using the above apparatus.

Additional objects, advantages and novel features of the invention will be set forth in part in the description which follows, and in part will become apparent to those skilled in the art upon examination of the following, or may be learned by practice of the invention.

In one aspect, then, the present invention relates to an apparatus for delivering ions to a vacuum chamber. The apparatus includes an ionization chamber comprising a chamber wall enclosing an ionization region and a vacuum interface at a vacuum interface voltage wherein the vacuum interface allows the ionization chamber to communicate with the vacuum chamber. Sample is introduced into the ionization chamber from an electrospray assembly at approximately ground potential. A first electrode is disposed sufficiently close to the electrospray assembly and charged to a first electrode voltage of sufficiently high magnitude to form ions in the ionization region. The first electrode also attracts the ions from the ionization region. Also disposed in the ionization chamber is a second electrode at a second electrode voltage that repels the ions to a greater degree than the first electrode. The vacuum interface voltage attracts the ions more strongly than the second electrode voltage. The apparatus also employs a means for generating a gaseous stream in a gas flow path extending from the first electrode to the second electrode, wherein the gaseous stream provides the ions with sufficient velocity to overcome repulsion by the second electrode. The chamber wall may be electrically connected to the electrospray assembly. In addition, the chamber is preferably at approximately atmospheric pressure.

In another aspect, the invention relates to the above apparatus wherein the first electrode comprises a first electrode aperture, and the gas flow path extends from the first electrode aperture to the second electrode. In addition or in the alternative, the second electrode may comprise a second electrode aperture, and the gas flow path extends from the first electrode to the second electrode aperture. The first and second electrodes each may be of any shape or geometry but preferably comprise a flat surface wherein the surfaces are substantially parallel to each other. In such a case, the gas flow path is preferably non-parallel with respect to the flat surfaces of the first and second electrodes. Optimally, the gas flow path is substantially orthogonal to the flat surfaces of the first and second electrodes. In addition, it is preferred that the vacuum interface communicates with the vacuum chamber in a direction that intersects with the gas flow path. Optimally, the direction is substantially orthogonal to the gas flow path, but it may be at any angle greater than or equal to zero to less than 180° with respect to said path.

In still another aspect, the invention relates to the above apparatus wherein the vacuum interface comprises an aperture in a plate. In the alternative, the vacuum interface may comprise a conduit having an axial bore. The conduit may be metallic or substantially electrically insulating. In addition, the axial bore may have a diameter of capillary dimension.

In a further aspect, the invention relates to the above apparatus wherein the means for generating a gaseous stream represents a component of the electrospray assembly.

In a still further aspect, the invention relates to the above apparatus wherein the first and second electrode voltages have opposite polarity. In such a case, the first electrode voltage may be positive or negative. In either case, the interface voltage may be approximately at ground.

In another aspect, the invention relates to a method for delivering ions to a vacuum chamber using the above apparatus. The method involves injecting a sample from the electrospray assembly into the ionization region and charging a first electrode to a sufficiently high ion-attractive voltage to produce sample ions in the ionization region. A gas flow is produced by generating a pressure differential within regions in the ionization chamber that result in a flow path extending from the first electrode to a second electrode. As a result, sample ions are transported away from the first electrode and past a second electrode at a second voltage that is more repulsive to the ion than the first electrode voltage. A vacuum interface is maintained at an interface voltage that is more attractive to the ion than the second electrode voltage such that the ion travels through the vacuum interface and into the vacuum chamber.

In still another aspect, the invention relates to a method for delivering ions to a mass analyzer in a vacuum chamber. The method involves providing first, second, and third electric field regions in an ionization chamber, wherein each region has a direction. Ions are produced from a sample emerging from a transport tube of an electrospray assembly at approximately ground potential within the ionization chamber. The ions are transported sequentially through the first, second, and third directional field regions and into the vacuum chamber such that the ions travel in a direction that forms: a first angle with respect to the first electric field direction when the ion is in the first electric field region; a second angle with respect to the second electric field direction when the ion is in the second electric field region; and a third angle with respect to the third electric field direction when the ion is in the third electric field region. The first and third angles are each no greater than 90° and the second angle is greater than 90°.

BRIEF DESCRIPTION OF THE FIGURES

The invention is described in detail below with reference to the following drawings:

FIG. 2 illustrates an ionization chamber of the invention wherein the vacuum interface comprises a conduit. FIG. 3 illustrates an ionization chamber employing a scupper that is electrically connected to the second electrode wherein the vacuum interface comprises a flat piece electrode having an opening therethrough.

DETAILED DESCRIPTION OF THE INVENTION

Figure 1:
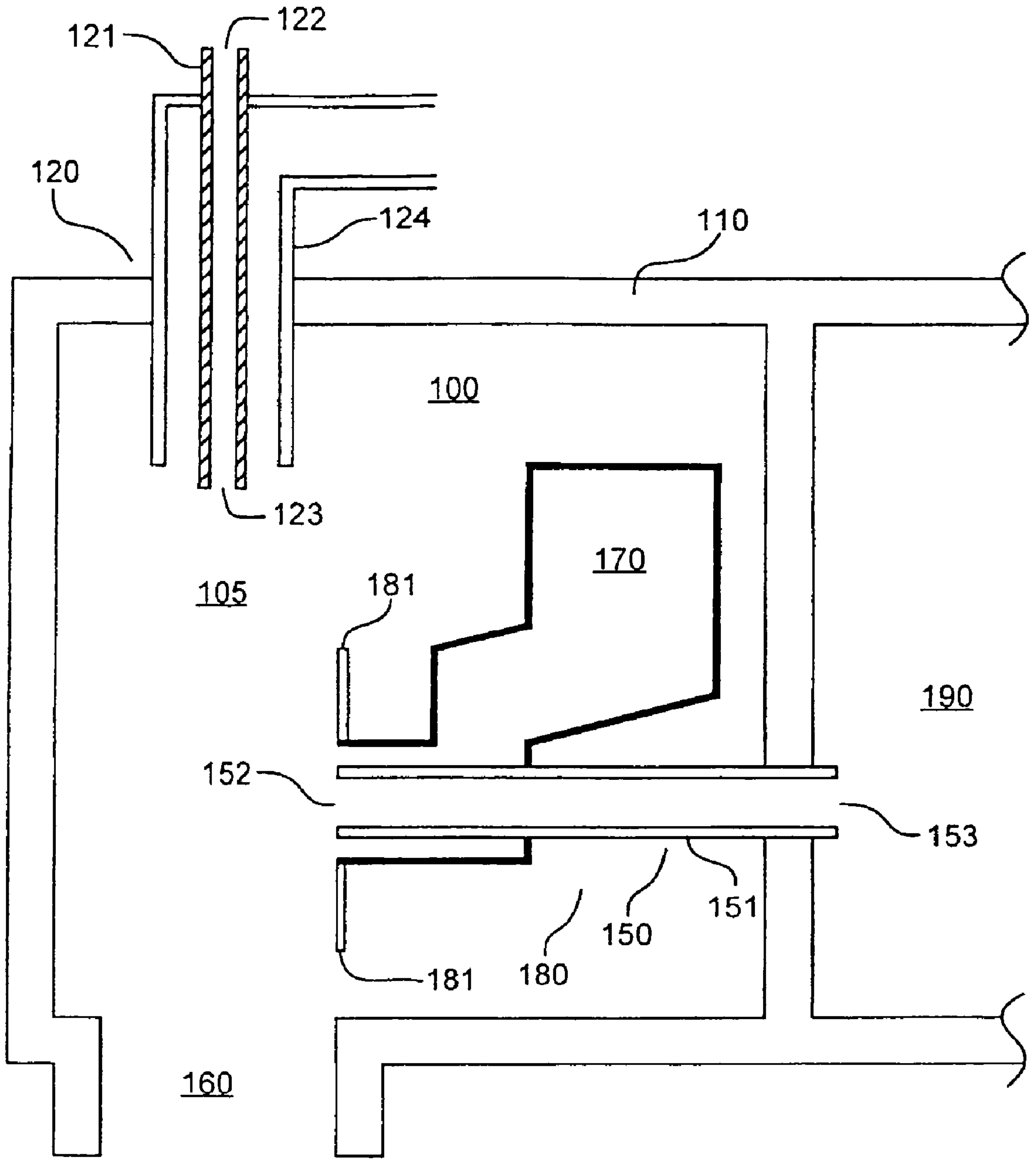
FIG. 1 schematically illustrates a side, cross-sectional view of a conventional ionization chamber for use in MS wherein a potential gradient is induced between an electrospray assembly and a vacuum interface.

Before describing the invention in detail, it must be noted that, as used in this specification and the appended claims, the singular forms "a," "an," and "the" include plural referents unless the context clearly dictates otherwise. Thus, for example, reference to "an electrode" includes more than one electrode, reference to "an ion" includes a plurality of ions and the like.

In describing and claiming the present invention, the following terminology will be used in accordance with the definitions set out below.

The term "angle" is used herein to refer to the minimum amount of rotation necessary to bring a direction into coincidence with another, as measured from 0° to 180°.

The terms "aperture" and "orifice" are used interchangeably herein to refer to a conduit having a length less than or about equal to its diameter (or minor dimension, in the case of an aperture of non-circular shape). As used to describe an interface between an ESI ion source and a vacuum chamber, useful orifice diameters include about 0.05 mm to about 2.0 mm, preferably about 0.1 mm to about 0.5 mm.

The term "capillary" is used herein to refer to a conduit having a bore of very small dimensions, typically having a diameter in the range of about 0.1 to about 3 mm and preferably about 0.2 to about 1 mm, and a length greater than the diameter.

The term "dielectric" and the term "insulator" are used herein interchangeably to refer to a material that does not substantially conduct electric current. Typical dielectric materials exhibit electrical conductivities less than about $10^{-5}$ and preferably less than about 10–$^{5}$ siemens/cm. The term "dielectric conduit" refers to a member that includes a tube constructed of a dielectric material, but does not necessarily exclude tubes that are made in part with an electrically conductive material.

The terms "ground" or "ground potential" are used herein in the sense generally understood by persons of ordinary skill in the art. Ground is the reference potential or zero potential of a complex of electronics or electrical systems. It may or may not be equal to earth potential or to the potential of the neutral of the power distribution system. Usually, the outer case and exposed areas of instruments such as ion sources and mass spectrometers are maintained at ground potential, but other ground arrangements are considered to be within the scope of the invention.

The term "in order" as used herein refers to a sequence of events. When an ion travels "in order" through a first electric field and a second electric field, the ion travels through the second electric field after traveling through the first electrical field. "In order" does not necessarily mean consecutive. For example, an ion traveling in order though a first field and a second field does not preclude the ion traveling through an intermediate field after traveling through the first field and before traveling through the second field.

The term "ion" is used in its conventional sense to refer to a charged atom or molecule, i.e., an atom or molecule that contains an unequal number of protons and electrons. Positive ions contain more protons than electrons, and negative ions contain more electrons than protons. Ordinarily, an ion of the present invention is singly charged, but may in certain instances have a multiple charge.

The term "polarity" as used herein to describe an object refers to the particular electrical state of the object's charge. The polarity of an object, e.g., an electrode or an ion, can be either positive, negative or neutral, but not any two simultaneously. An electrode having more electrons than protons is said to be negatively charged, attracting positively charged ions and repelling negatively charged ions. A positively charged electrode at a high voltage repels a positive ion to a greater degree than a positively charged electrode at a lower voltage. Alternatively stated, a positively charged electrode at a low voltage is more attractive to a positive ion than is a positively charged electrode at a higher voltage.

The present invention is directed to an apparatus for delivering ions to a vacuum chamber. The apparatus includes an ionization chamber, an enclosed ionization region and a vacuum interface at a vacuum interface voltage, wherein the interface allows the ionization chamber to communicate with the vacuum chamber. Disposed within the ionization chamber is a sample inlet of an electrospray assembly at approximately ground potential. Two electrodes are provided within the chamber such that three electric fields are generated, a first field extending from the electrospray assembly to the first electrode, a second field extending from the second electrode to the first electrode, and a third field extending from the second electrode to the vacuum interface. An ion is forced to travel through the fields, in order, before entering the vacuum chamber. Unlike previous devices for delivering ions to a vacuum chamber, the directions of the fields are arranged in a manner that allow both the electrospray assembly and the vacuum interface to be at approximately ground potential. In addition, the invention is also directed to a method for delivering ions to a vacuum chamber and, in particular, to a mass analyzer in a vacuum chamber.

The invention is described herein with reference to the figures, in which like parts are referenced by like numerals. The figures are not to scale, and certain dimensions may be exaggerated for clarity of presentation.

To provide an example of a prior art device, FIG. 1 is a schematic illustration of an electrospray ionization chamber of a conventional mass spectrometer that does not embody the invention. The electrospray ionization chamber 100 comprises a housing 110 containing an ionization region 105, preferably operated substantially at or near atmospheric pressure, an electrospray assembly 120, a vacuum interface 180 comprising a capillary assembly or orifice 150 and an electrode 181 for attracting ions toward the vacuum interface 180 and into a vacuum chamber 190 that typically contains a mass analyzer or detector (not shown). Optionally, the ionization chamber 100 includes a drain port or vent 160 and a means of supplying drying gas 170.

The interface is positioned relative to the electrospray assembly such that electrospray can be initiated and sustained without frequent electrical breakdown, shorting, arcing, or distortion of the ionizing electric field due to condensation build-up or liquid droplets bridging high voltage elements within the ionization chamber or housing. As illustrated, all components of the vacuum interface are electrically connected through physical contact. The capillary assembly 150 of the vacuum interface as illustrated in FIG. 1 comprises a capillary 151 with an inlet 152 and an exit 153, and optional means of introducing drying gas 170 into the ionization chamber 100. The capillary provides the ionization chamber communication with the vacuum chamber is typically fabricated from glass and metal. Alternatively, the capillary assembly may be replaced by an orifice.

The vacuum interface 180 is also electrically connected due to physical contact to the housing of the ionization chamber and is typically operated at approximately ground potential, that is, at a voltage from about −400 volts to 400 volts, typically from about −40 volts to about 40 volts, more preferably from about −10 volts to about 10 volts. The housing may be fabricated from any material providing the requisite structural integrity and which does not significantly degrade, corrode, or outgas under typical conditions of use. Typical housings are fabricated from materials including metals such as stainless steel, aluminum, and aluminum alloys, and other electrically conductive materials. Parts of the housing may include plastics, such as Delrin® acetal resin and tetrafluoroethylene, e.g., Teflon®. Composite or multilayer materials may also be used.

As illustrated in FIG. 1, the electrospray assembly 120 comprises a hollow needle 121 with an inlet 122 to receive liquid samples, such as from a liquid chromatograph, flow injector, syringe pump, infusion pump, or other sample introduction means, and a dispensing end 123. As shown, the hollow needle 121 is disposed in vertical orientation having a sample inlet 122 above the dispensing end 123. An optional concentric tube or sheath 124 that axially surrounds the needle 121 may be used to introduce nebulizing gas or liquid to assist in the formation of the aerosol. The electrospray assembly 120 is typically fabricated from stainless steel or both stainless steel and fused silica. The electrospray assembly 120 is operated at a relative high voltage with respect to vacuum interface voltage which is at approximately ground. Means for charging the electrospray assembly to a proper voltage include wires and electrical contacts (not shown). During operation, an electrical potential difference is generated between the electrode 181 of the vacuum interface 180 and the electrospray assembly exit on the order of about 1,000 volts to about 8,000 volts. As illustrated, the electrospray assembly, particularly the tip of the needle, i.e., the dispensing end 123, is sharp to ensure that a strong voltage gradient is generated to produce the desired ions.

With reference to FIG. 1, during operation, a liquid sample containing analyte enters the electrospray assembly 120 and is introduced into ionization region 105 within the ionization chamber 100 via dispensing end 123. Liquid flow rates are typically in the range of from about 1 microliter/minute to about 2,000 microliters/minute. The ionization region 105 is operated substantially at or near atmospheric pressure, that is, preferably between about 660 torr and about 860 torr. The temperature within the ionization chamber is typically from about 20 degrees Celsius to about 450 degrees Celsius. Operation at ambient temperature is convenient and suitable for many applications. The source of the sample may optionally be a liquid chromatograph, capillary electrophoresis unit, supercritical fluid chromatograph, ion chromatograph, flow injector, infusion pump, syringe pump, or other sample introduction means (not shown). Optionally a fluid sheath, such as nitrogen or carbon dioxide, or an inert nebulizing liquid may be introduced via an outer concentric tube 124 that surrounds the needle to assist in the formation of the aerosol. The sample leaving the electrospray assembly 120 via outlet 123 is dispersed into charged droplets under the influence of the electric field generated within the ionization chamber 100 as a result of the potential difference between the electrospray assembly and the vacuum interface. The charged droplets are typically evaporated and desolvated by heating or under the influence of drying gas introduced into the ionization chamber 100. The ions are forced to exit the ionization chamber 100 via an end 152 of the capillary 150 within the ionization chamber, by application of an electrical potential to electrode 181. The ions travel through the vacuum interface 150 in a direction that intersects the direction that extends from the electrospray inlet 122 to the dispensing end 123 and subsequently enter into the vacuum chamber 190.

Figure 2:
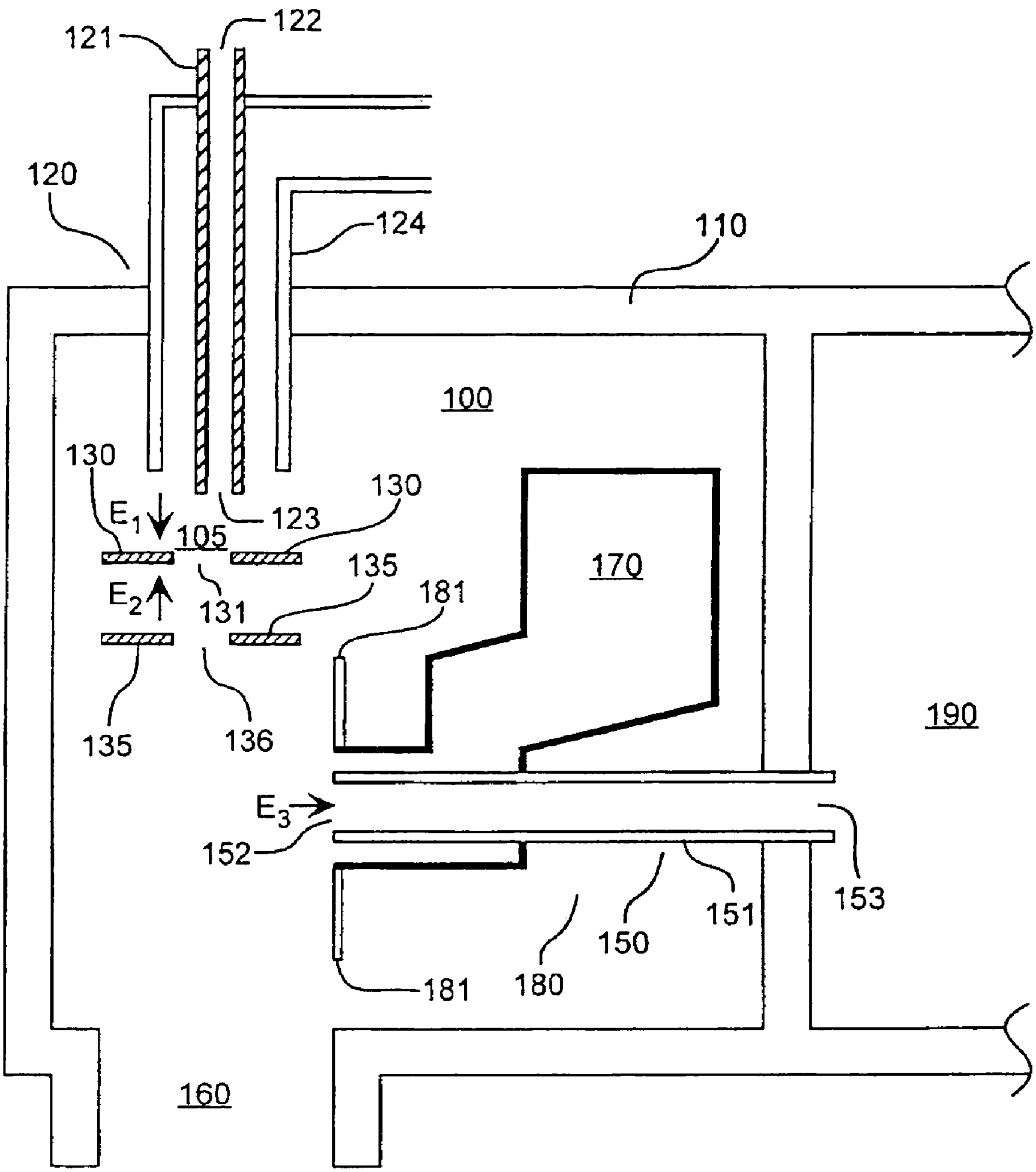
FIGS. 2 and 3 schematically illustrate side cross-sectional views of alternative embodiments of the present invention, each employing a first electrode, a second electrode and an electrospray assembly.

FIG. 2 is a schematic illustration of an embodiment of the invention. Similar to ionization chambers of prior art devices, the electrospray ionization chamber 100, here, also comprises a housing 110 containing an ionization region 105, preferably operated substantially at or near atmospheric pressure, an electrospray assembly 120, a vacuum interface 180 comprising a capillary assembly or orifice 150 and an electrode 181 for attracting ions toward the vacuum interface 180, optionally a drain port or vent 160, and optionally a means of supplying drying gas 170. However, two additional electrodes 130 and 135 are disposed within the ionization chamber, each comprising a preferably flat member having openings 131 and 136 respectively therethrough. The flat members and the openings may each be circular, in which case the electrodes may be described as having a dual-halo configuration. The electrodes as shown are substantially parallel with each other and orthogonal to the electrospray assembly 120. The openings 131 and 136 are aligned such that a straight line extending from sample outlet 123 of the electrospray assembly 120 passes orthogonally through both openings. Also as shown, the area of the second electrode 135 that is orthogonal to the electrospray assembly is no greater than the area of the first electrode 130 orthogonal to the electrospray assembly, and the electrodes 130 and 135 are disposed such that the second electrode is substantially “hidden” from the electrospray assembly 120. By “hidden” it is meant that the electrospray assembly is not subject to electric field effects associated with the voltage of the second electrode.

The electrospray assembly 120 is equipped with a hollow needle 121 having a sample inlet 122 and a dispensing end 123 and a concentric tube 124 that surrounds the hollow needle, where the concentric tube is adapted to convey or provide a gas stream. The gas stream nebulizes a sample emerging from the dispensing end 123 of the hollow needle 121, to entrain sample droplets containing ions, and to force the ions to travel through openings 131 and 136. As is apparent from FIG. 2, the direction of the gas flow is defined from the first electrode opening 131 to the second electrode opening 136.

In operation, a liquid sample containing analyte enters the electrospray assembly 120 through inlet 122 and is introduced into ionization region 105 within the ionization chamber 100 via the dispensing end 123 of the hollow needle. An inert nebulizing gas, such as nitrogen or carbon dioxide, is introduced via concentric tube 124 to assist in the formation of the aerosol. The electrospray assembly 120 is held at approximately ground potential. The first electrode is charged to a first electrode voltage. As the sample leaves the electrospray assembly 120 via exit 123, the sample is dispersed into droplets by the nebulization gas. In addition, the first electrode voltage is sufficiently high to generate a first electric field within the ionization chamber 100, specifically in a region between the electrospray assembly and the first electrode, to charge the droplets as they emerge from the electrospray assembly. An ion within the droplet will have an opposing polarity from the polarity of the first electrode. As a result, the ion will be attracted by the first electrode. Alternatively stated, the first electric field generated by the potential difference between the electrospray assembly and the first electrode will have a direction, indicated in FIG. 2 as arrow $E_1$, pointing away from the electrospray assembly and toward the first electrode. The ion will tend to travel along the direction of the electric field. In addition, the gas stream from the concentric tube of the electrospray assembly will also tend to entrain the ion and accelerate the ion in the direction of the gas flow. Ions produced in the first electric field will tend to travel toward and through the first electrode opening.

In addition, the second electrode 135 is charged to a second electrode voltage that is more repulsive to the ion than the first electrode voltage. As a result, a second electric field is generated in the ionization chamber between the first electrode 130 and second electrode 135. It is preferred that the second electrode voltage is of opposite polarity relative to the first electrode voltage. Whether the first electrode voltage is positive or negative depends on the desired polarity of the ionized sample molecule or atom. The second electric field has an associated direction as indicated by arrow $E_2$. The second electric field direction originates from the second electrode toward the first electrode. In other words, the ion that is generated in the ionization region and that has been accelerated through the first electrode opening into the second electric field will tend to be generally repulsed by the second electrode. Nevertheless, the ion is forced to travel through the second electrode opening, e.g., by producing a gas stream that is adapted to entrain the ion and provide the ion with sufficient velocity to overcome the repulsive force of the second electric field. This gas stream may be generated by forcing pressurized gas through the tube surrounding the hollow needle of the electrospray assembly or by another flow of gas. Without such force, the second electric field may repel the ion back toward the first electrode, thereby effectively preventing the ion from reaching the vacuum interface 180.

As shown, a vacuum interface 180 is provided to allow communication between the ionization chamber 100 and the vacuum chamber 190. The vacuum interface 180 comprises a dielectric capillary 151 and an electrode 154 and is similar to those used in conventional ionization chambers. The vacuum interface 180, and the electrode in particular, is electrically connected by direct physical contact with a wall of the apparatus separating the ionization chamber and the vacuum chamber. The interface may have any voltage as long as the interface voltage is more attractive to the ion than the voltage of the second electrode. Preferably, the interface voltage is at approximately ground potential. Because of the voltage difference between the second electrode and the vacuum interface, an ion emerging from the second electrode orifice will be repelled from the second electrode and attracted to the vacuum interface. As a result, the ion will travel through the vacuum interface and into the vacuum chamber. The ion can optionally be delivered to a mass analyzer (not shown in FIG. 2) in a vacuum chamber, optionally through additional ion optical elements (not shown) as is known in the art. Alternatively stated, a third electric field is created between the second electrode and the vacuum interface. The third electric field has an associated direction as indicated by arrow $E_3$ extending from the second electrode to the vacuum interface. As shown, the third electric field direction is substantially orthogonal to the flow path of the gas stream. Such orthogonality is optimal but not critical to the invention. In general, it is preferred that the flow path of the gas stream does not intersect the vacuum interface. When the flow path of the gas stream intersects with the vacuum interface, droplets contacting the interface may result in excess mass detector signal noise. However, the direction of drying air may be reversed to effect entrainment of ions toward the vacuum interface as shown.

Figure 3:
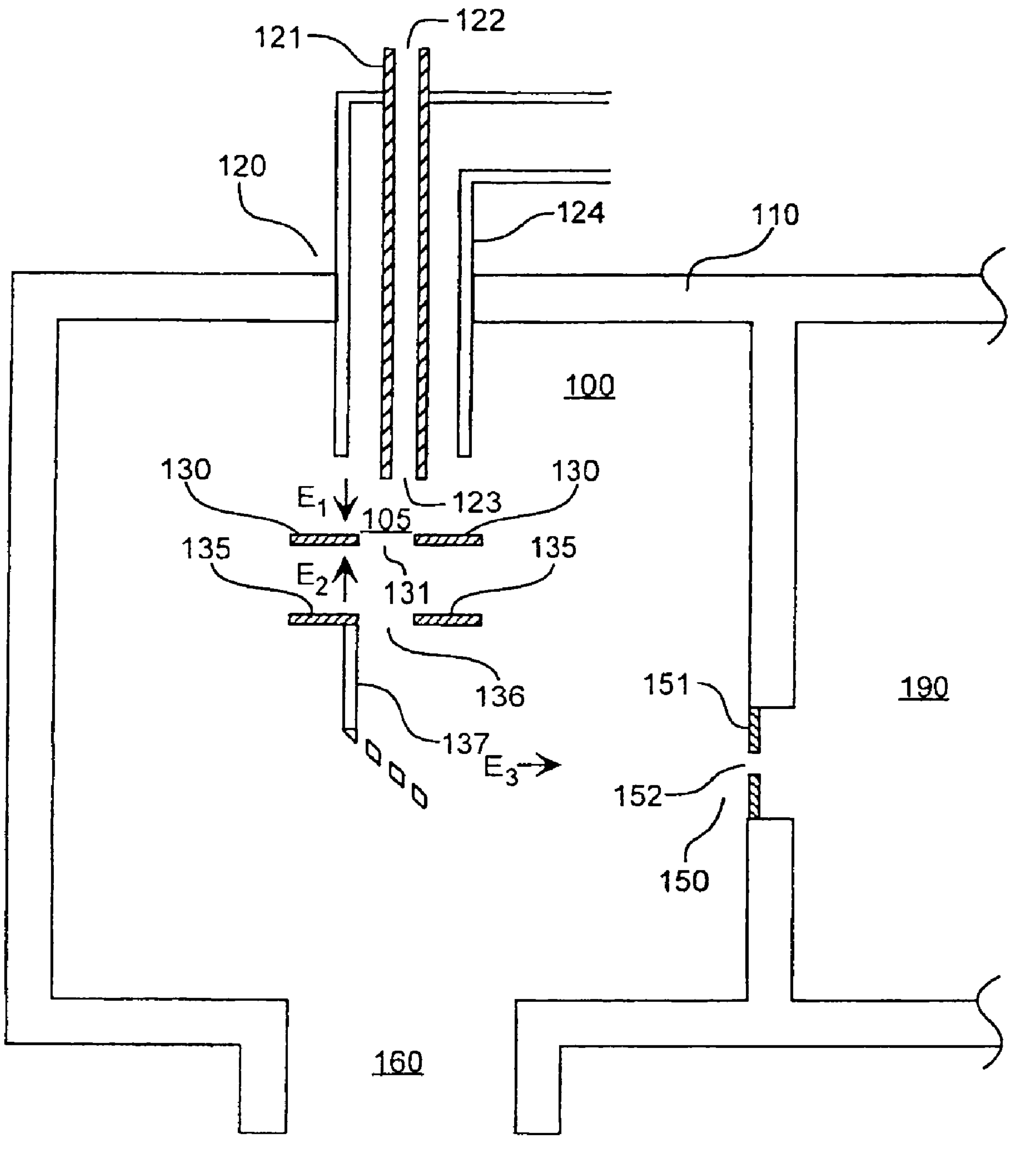

FIG. 3 schematically illustrates another embodiment of the invention. In this embodiment, the vacuum interface comprises a flat plate 151 having an aperture 152 therethrough. The flat plate 151 is electrically connected with the housing 110. Like the embodiment of FIG. 2, the second electrode 135 comprises a flat piece with an opening 136 therethrough. However, an additional scupper 137 is electrically attached to a downstream surface of the second electrode 135. The scupper may be a solid metallic piece or a mesh as shown. The purpose of the scupper is two-fold. As discussed above, once ions have traveled past the second electrode, the third electric field directs the ions toward the vacuum interface. The scupper may be shaped to optimize the third electric field to efficiently deliver ions to the vacuum interface. In addition, the scupper may provide some directionality to the gas flow and facilitate efficient delivery of ions to the vacuum interface. A mesh is preferred as a scupper because the solid portion of the mesh tends to direct ions toward the vacuum interface while the holes of the mesh allow uncharged droplets to pass through so as to avoid interference with ion delivery and generation of excessive background noise. In some embodiments, electrodes 130 and/or 135 may be partially or entirely constructed of mesh.

Figure 4:
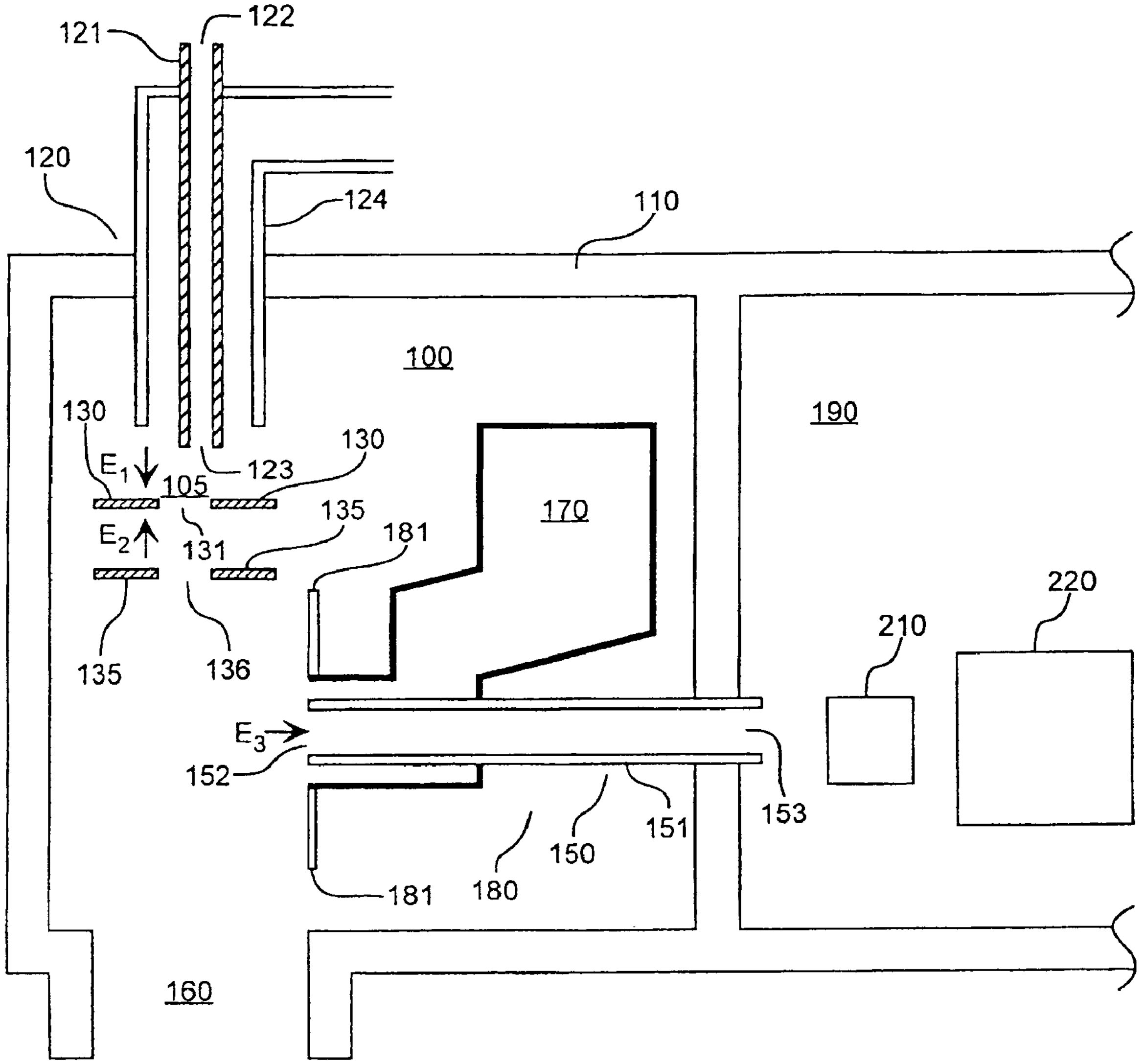
FIG. 4 schematically illustrates the ionization chamber of FIG. 2 combined with a mass analyzer and, optionally, ion optic elements.

FIG. 4 illustrates schematically the use of the invention in a mass spectrometer system. An ionization chamber 100 containing the inventive electrodes 130 and 135 is attached to vacuum chamber 190, with vacuum interface 180 allowing communication between the chamber as described above. A mass analyzer 220, optionally with ion optic elements 210, is provided in the vacuum chamber. An ion traveling through the vacuum interface 180 and exiting into the vacuum chamber 190 via capillary end 152 enters mass analyzer 220, optionally after passing through ion optics elements 210, as known in the art. The ion is analyzed according to its mass/charge by mass analyzer 220, which includes an ion detection means and signal analysis system (not explicitly shown). Such mass analysis systems together with ion sources constitute mass spectrometers and are well known in the art. They include, but are not limited to, quadruple mass filters, ion traps, magnetic sector instruments, time-of-flight mass spectrometers and Fourier Transform Ion cyclotron Resonance spectrometers. Although FIG. 4 illustrates the use of the invention with a capillary interface 150 and a mass analyzer, it will be clear that other vacuum interfaces can be used in the application, such as the plate 151 and aperture 152 illustrated in FIG. 3.

The invention also encompasses a method for delivering ions to a vacuum chamber. The method provides first, second and third electric field regions in an ionization chamber wherein each region has a direction. An ion is produced from a sample emerging from a dispensing end of an electrospray assembly at approximately ground potential within the first electric field region. Once the ion is produced, it is transported in order through the first, second and third directional field regions and into the vacuum chamber. The ion-path direction is such that it forms first, second and third angles with the first, second, and third electric fields respectively, wherein the first and third angles are each no greater than 90° and the second angle is greater than 90°. It is preferable that the first and third angles are no greater than about 15° and that the second angle is no less than about 165°. In other words, while traveling through the first electric field region, the ion path direction is generally aligned with the first electric field direction. Similarly, while the ion is traveling through the third electric field region, the ion path direction is also generally aligned with the third electric field direction. However, while traveling through the second electric field, the ion path direction is generally opposed by the second electric field. This can be accomplished by providing a gas stream that entrains the ion and flows against the electric field. The gas stream can be provided by generating a pressure differential in the direction of desired gas flow. The pressure differential may be generated from a pressurized gas source, a vacuum, or both. The use of a pressurized gas in the tube surrounding the hollow needle of the electrospray assembly is described above. A higher pressure gradient may be generated using a pressurized gas source when the ionization chamber is at approximately atmospheric pressure, because the maximum pressure gradient that can be generated between a chamber at atmospheric pressure and an absolute vacuum is atmospheric pressure. A desired pressure gradient may vary with the overall arrangement of the components of the ionization chamber. Such gradients may be produced by various means, for example, by partitioning the chamber into compartments, or regions, of different pressurization. The electrodes 130 and 135 may be designed such as to form all or part of suitable partitions for this purpose. A higher pressure gradient is desirable when the electric field strongly opposes ion travel. A lower pressure gradient may be suitable when the electric field does not strongly opposed ion travel. Once the ions have traveled through the electric fields, they are delivered into a vacuum chamber, more specifically, optionally through ion optical elements to a mass analyzer in the vacuum chamber. Such ion optical elements are known to one of ordinary skill in the art.

It is evident that the present invention provides many advantages previously unknown in the art. A mass spectrometer having both the electrospray assembly and the ionization chamber at ground potential provides safer working conditions for the operator of the mass spectrometer. In addition, the invention provides a savings in overall spectrometer production and operating cost. Cheaper, simpler power supplies can be used to supply potentials to the source electrodes, since the major leakage currents from the electrospray assembly to ground are eliminated by the invention. Finally, it is evident from the figures that only slight modifications to the design of conventional spectrometers are needed for an operator to benefit from the advantages of the invention.

It is to be understood that while the invention has been described in conjunction with the preferred specific embodiments thereof, that the foregoing description is intended to illustrate and not limit the scope of the invention. Other aspects, advantages and modifications within the scope of the invention will be apparent to those skilled in the art to which the invention pertains. For example, the electrodes of the present invention are not necessarily flat. Any shape may be used that produces the desired electric fields with respect to the direction of ion travel as described above. These shapes include, but are not limited to, regular and irregular three-dimensional body types such as, annular, ellipsoidal, polyhedral spherical, and toroidal.

All patents mentioned herein are hereby incorporated by reference in their entireties.

The invention claimed is:

1. An apparatus for delivering ions to a vacuum chamber comprising:

an enclosing ionization chamber including an ionization region and a vacuum interface at a vacuum interface voltage, wherein the vacuum interface allows the ionization chamber to communicate with the vacuum chamber;

a first electrode disposed sufficiently close to a dispensing end of an electrospray assembly and having a first electrode voltage of a magnitude that forms ions in the ionization region and attracts the ions from the ionization region;

a second electrode disposed in the ionization chamber at a second electrode voltage that repels the ions to a greater degree than the first electrode voltage; and means for generating a gaseous stream in a gas flow path extending from the first to the second electrode, wherein the gaseous stream provides the ions with sufficient velocity to overcome repulsion by the second electrode, wherein the vacuum interface voltage provides a third electric field region that is more attractive to the ions than the electrode field region of the second electrode.

2. The apparatus of claim 1, wherein the first electrode includes a first electrode aperture and the gas flow path extends from the first electrode aperture to the second electrode.

3. The apparatus of claim 1, wherein the second electrode includes a second electrode aperture and the gas flow path extends from the first electrode to the second electrode aperture.

4. The apparatus of claim 1, wherein the first and second electrodes each comprise a flat surface substantially parallel to each other.

5. The apparatus of claim 4, wherein the gas flow path is substantially orthogonal to the flat surfaces of the first and second electrodes.

6. The apparatus of claim 1, wherein the first electrode, the second electrode, or both comprise a mesh portion.

7. The apparatus of claim 1, wherein the vacuum interface comprises an aperture in a plate.

8. The apparatus of claim 1, wherein the vacuum interface comprises a conduit having an axial bore.

9. The apparatus of claim 8, wherein the conduit is substantially electrically insulating.

10. The apparatus of claim 8, wherein the axial bore has a diameter of capillary dimension.

11. The apparatus of claim 1, wherein the means for generating a gaseous stream represents a component of the electrospray assembly.

12. The apparatus of claim 1, wherein the first and second electrode voltages have opposite polarity.

13. The apparatus of claim 1, wherein the interface voltage is approximately at ground.

14. The apparatus of claim 1, wherein the ionization chamber is electrically connected to the electrospray assembly.

15. The apparatus of claim 1, further comprising a scupper electrically attached to a downstream surface of the second electrode.

16. The apparatus of claim 1, wherein the scupper is at least partially constructed of mesh.

* * * * *